United States Patent [19]

Polednak et al.

[11] Patent Number: 5,226,181
[45] Date of Patent: Jul. 13, 1993

[54] MOUNTING DEVICE FOR NIGHT VISION MOUNT AND GOGGLE ASSEMBLY

[75] Inventors: Michael D. Polednak, Mayfield; Charles F. Acker, Equinunk; Francis J. Kuna, Carbondale, all of Pa.

[73] Assignee: Gentex Corporation, Carbondale, Pa.

[21] Appl. No.: 822,601

[22] Filed: Jan. 17, 1992

[51] Int. Cl.$^5$ .......................... A42B 3/00; A42B 9/02
[52] U.S. Cl. .............................. 2/422; 2/6; 2/424; 359/409; 359/815
[58] Field of Search ............ 2/422, 424, 410, 6, 2/8, 9, 10; 359/409, 410, 411, 815, 816; 224/181

[56] References Cited

U.S. PATENT DOCUMENTS

| | | |
|---|---|---|
| 4,592,096 | 6/1986 | Glasheen .............. 359/409 X |
| 4,689,834 | 9/1987 | McCarthy et al. ............ 2/422 |
| 4,697,783 | 10/1987 | Kastendieck et al. ............ 2/6 |

Primary Examiner—Peter Nerbun
Attorney, Agent, or Firm—Shenier & O'Connor

[57] ABSTRACT

Apparatus for detachably securing a night vision goggle mount to a protective helmet visor housing in which the heads of a pair of upper fasteners carried by the mount are adapted to be inserted through the head receiving portions of a pair of upper keyhole slots in a base plate on the housing against the action of a leaf spring on the plate. When the shanks of the fasteners are moved into the lower head-retaining portions of the upper slots, the upper fastener heads are held by ears on the leaf spring to lock the mount. A releasing element on the base plate is adapted to be actuated to flex the spring to a position at which the spring ears are clear of the upper fastener heads to permit the mount to be removed. Preferably, a pair of lower fasteners having heads and a pair of corresponding lower keyhole slots are provided to insure stability and alignment of the night vision goggle mount.

17 Claims, 3 Drawing Sheets

MOUNTING DEVICE FOR NIGHT VISION MOUNT AND GOGGLE ASSEMBLY

FIELD OF THE INVENTION

The invention is in the field of protective helmets and more particularly it relates to a device for readily detachably mounting a night vision goggle mount assembly on a protective helmet.

BACKGROUND OF THE INVENTION

There are known in the prior art sophisticated night imaging devices which enable helicopter pilots to fly during starlit and moonlit nights. Helicopter pilots are provided with protective helmets carrying visor housings which support one or more visors for movement between a retracted position within the housing and an extended position in front of the pilot's eyes. The imaging devices referred to hereinabove normally are hard mounted on a platform formed in the protective helmet visor housing.

As is also known in the art, the night imaging devices are extremely expensive. For that reason, only a limited number of such devices are procured.

SUMMARY OF THE INVENTION

One object of our invention is to provide a device for readily detachably mounting a night vision goggle mount assembly on a pilot's protective helmet.

Another object of our invention is to provide a device for readily detachably mounting a night vision goggle mount assembly on a protective helmet which is inexpensive for the result achieved thereby.

Yet another object of our invention is to provide a mounting device for a night vision goggle mount assembly which facilitates increased overall usage of the night vision goggle mount assembly.

Another object of our invention is to provide a device for permitting a pilot to don and doff the night vision goggle mount assembly with the use of only one hand.

Still another object of our invention is to provide a mounting device for a night vision goggle mount assembly which has a low profile.

A still further object of our invention is to provide a mounting device for a night vision goggle mount assembly which is lightweight.

Yet another object of our invention is to provide a device for readily detachably mounting a night vision goggle mount assembly on a protective helmet so as not to interfere with the maximum protection afforded by the helmet.

A further object of our invention is to provide a device for readily detachably mounting a night vision goggle mount assembly on a protective helmet which is simple in construction and operation.

Other and further objects of our invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views.

DESCRIPTION OF THE PREFERRED EMBODIMENT

Figure 1:
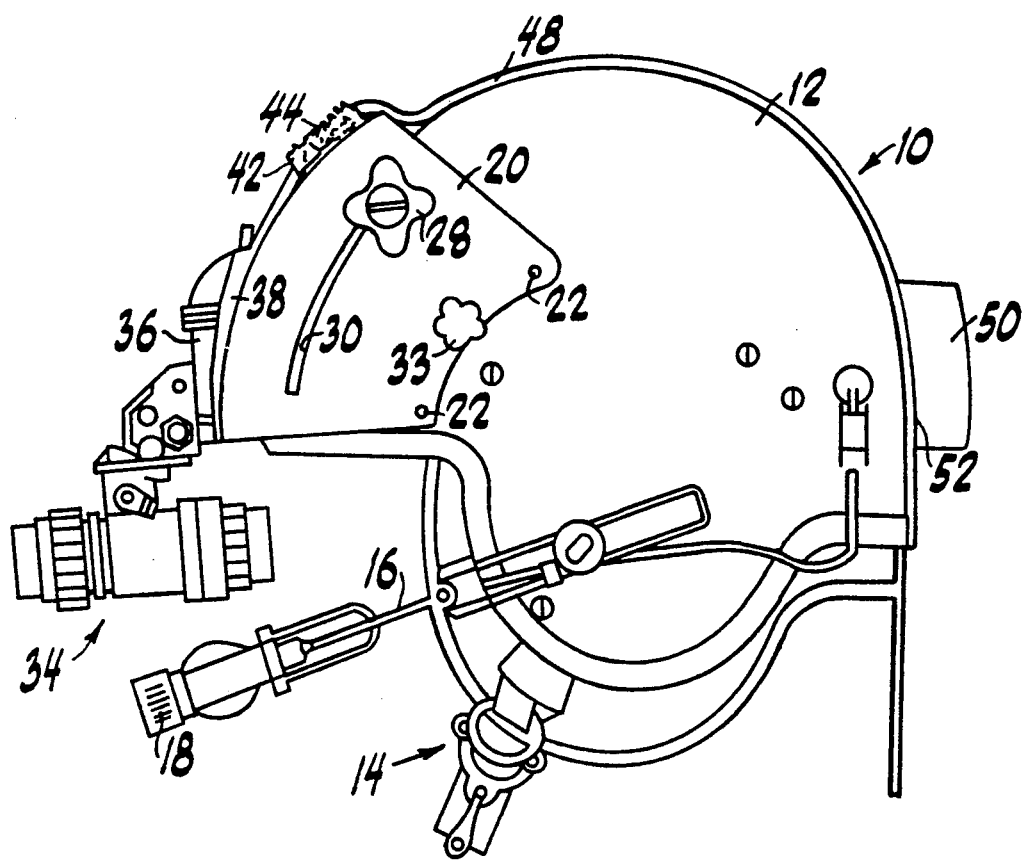
FIG. 1 is a side elevation of a protective helmet carrying a night vision goggle and mount assembly supported on the helmet by means of our device for readily detachably mounting the night vision goggle mount assembly.
Figure 2:
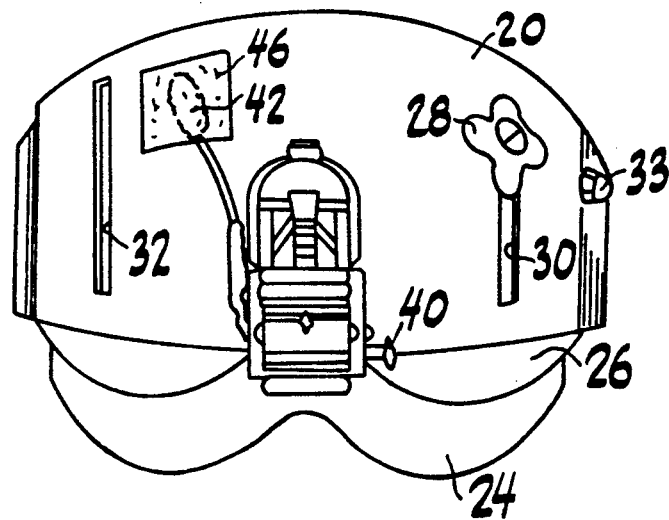
FIG. 2 is a front elevation of the goggle mount assembly, visor and housing assembly of the helmet shown in FIG. 1 incorporating our device for readily detachably mounting the night vision goggle mount assembly on the helmet visor housing.
Figure 4:
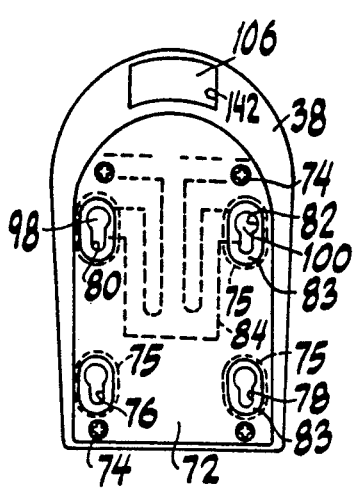
FIG. 4 is a front elevation of the portion of our device carried by the helmet visor housing.
Figure 3:
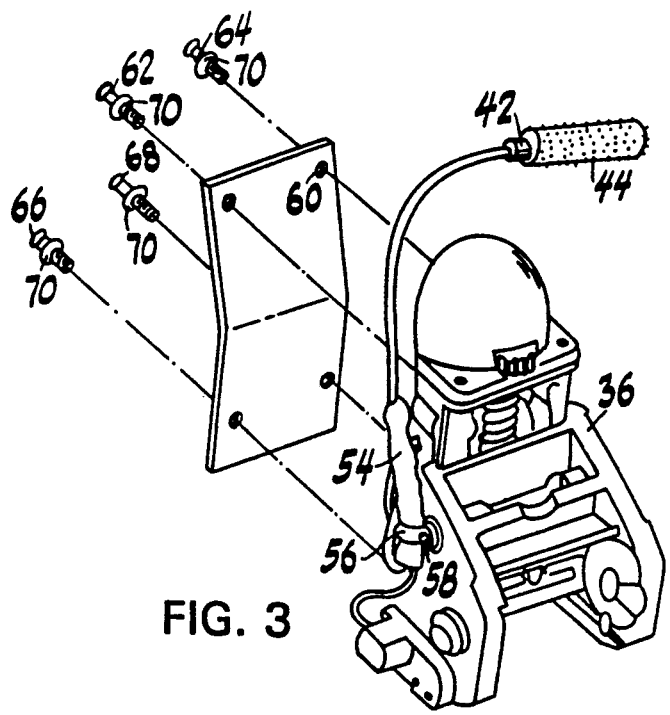
FIG. 3 is an exploded perspective view illustrating the portion of our device carried by the night vision goggle mount assembly.

Referring now to FIG. 1, a protective helmet indicated generally by the reference character 10, includes a hard outer shell 12 and a chinstrap 14 for securing the helmet on the wearer's head. A communication boom 16 supported on the helmet 10 in a manner known to the art carries a microphone 18.

The helmet 10 is provided with a dual visor assembly which includes a visor housing or cover 20 secured to the shell 12 by any suitable means such as screws 22. Visor housing 20 protects respective inner and outer visors 24 and 26 when stored in a housed position out of the wearer's line of vision.

Means is provided for releasably locking visors 24 and 26 in their retracted and extended positions. For example, a knob 28 carried by a screw or the like extending outwardly through a slot 30 or 32 in the housing 20 is adapted to be actuated to hold visor 26 in position. A second knob 33 extending beneath either side of the housing 20 is adapted to be actuated to hold the visor 24 in position. Since the visor mounting means and adjusting means are well known in the art and form no part of the instant invention, they will not be discussed in further detail.

The night vision goggle assembly indicated generally by the reference character 34 includes a mount 36 which supports the goggles for movement between a retracted position out of the wearer's line of vision and an extended position shown in full lines in FIG. 1 in which the goggles are in the line of vision of the wearer. Means are provided for adjusting the position of the goggles relative to the wearer's line of vision. Since this means and the other details of the assembly 34 are known in the art and do not per se form part of our invention, they will not be described in further detail.

The mount 36 is adapted to be supported on a platform or prominence 38 formed in the housing 20. The mount 36 carries a lock pin 40 adapted to be operated in a manner know to the art to hold the goggles in either of their retracted or extended positions.

An electrical connector 42 carried by a conductor extending out of the mount 36 is provided with a hook fastener cover 44 adapted to cooperate with a pile fastener pad 46 secured to the visor housing 20 to secure and resist undesirable entanglement of the conductors and connectors.

A conductor 48 releasably engaged with the conductor 42 extends over the top of the helmet 10 to a battery pack 50 releasably secured to a pile fastener pad 52 carried by the helmet shell 12.

We provide means for preventing undue strain on the conductor leading from the connector 42 to the interior of the mount 36. Specifically, we engage a sleeve 54 on an intermediate portion of this conductor and clamp the sleeve 54 to the mount 36 by means of a clamp 56 secured to the mount by means of an existing nut 58.

By way of further modifying the standard night vision goggle mount 36 in accordance with our invention, we secure a backing plate 60 over the back of the mount 36 to cover the unprotected electrical wires housed therein. We employ respective upper locating pins 62 and 64 and lower locating pins 66 and 68 which are threaded to secure the backing plate 60 over the back of the mount 36. Pins 62 and 64 have a head comprised of two shapes beginning with a truncated conic shape and ending with a cylindrical shape while pins 66 and 68 have spherical heads. Respective shoulders 70 integral to pins 62, 64, 66 and 68 limit the inward movement thereof relative to the mount 36 in securing the plate 60 in position. There is also a shank portion 71 integral to the pins of sufficient length to perform the locating and attaching function to be described hereinbelow.

We form the base plate 72 with a pair of lower locating pin receiving keyholes 76 and 78 and with a pair of upper locating pin receiving keyholes 80 and 82. These keyholes 76, 78, 80 and 82 lie on a recessed surface 83 which helps extablish alignment of the locating pins 62, 64, 66 and 68. Screws 74 secure the base plate 72 to the platform 38 with four openings 75 in the platform registering with the respective keyholes 76, 78, 80 and 82. The upper generally circular portions of the keyholes 76, 78, 80 and 82 are of a size sufficient to admit the heads of the respective pins 66, 68, 62 and 64. The lower slot-like keyhole portions permit passage of the locating pin shanks therealong but do not permit outward movement of the locating pin heads.

Our device includes a leaf spring indicated generally by the reference character 84 having a central portion 88 extending upwardly from a base 86. A pair of lateral extensions 90 and 92 at the top of the portion 88 receive mounting screws in a manner to be described.

The spring 84 is formed with a pair of vertically extending arms 94 and 96 formed with respective ears 98 and 100 which cover the generally circular portions of the upper keyholes 80 and 82 when the spring is in position. We bend out the upper ends 102 and 104 of the arms 94 and 96 for a reason to be described hereinbelow.

Our device includes an actuator 106 which is bifurcated to form a pair of spaced shoes 108 and 110. The actuator 106 is adapted to be received in a housing 112 having a recess 114, the sides of which are formed with slots 116 and 118 for receiving beads 119 on the sides of actuator 106 so that the actuator 106 can be snapped into the recess 114. In this position of the parts, a guide 120 in the housing is received in a slot 122 formed between the two shoes 108 and 110. A post 124 formed at the base of slot 122 receives a spring 126 which bears against the guide 120 to urge the actuator 106 to a position at which shoulders 128 and 130 on shoes 108 and 110 engage the underside of housing 112. We form the housing 112 with a pair of ears 136 and 138. In assembling the spring 84 and the actuating mechanism to the platform 38, screws 74 pass through the base plate 72, the platform 38, the lateral extensions 90 and 92, and are threaded into bores in the ears 136 and 138. Additional screws 74 secure the lower end of the base plate 72 to platform 38. As the operating assembly, housing 112 and spring 84 are assembled on the platform, actuator 106 extends outwardly through an opening 142 in the platform.

Figure 7A:
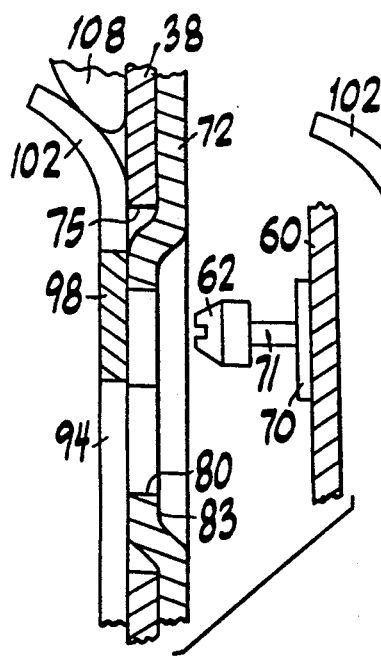
FIG. 7A is a fragmentary sectional view illustrating the relative positions of parts of our device prior to attachment of the night vision goggle mount assembly on the helmet visor housing.
Figure 7B:
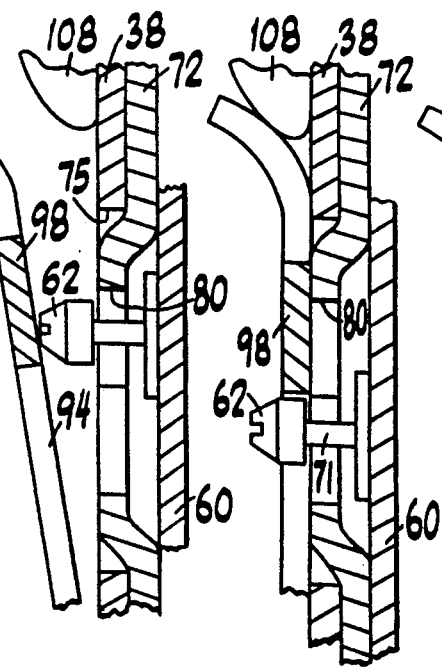
FIG. 7B is a fragmentary sectional view illustrating the relative positions of parts of our device in an intermediate stage of the attachment of the night vision goggle mount assembly to the helmet visor housing.
Figure 7C:
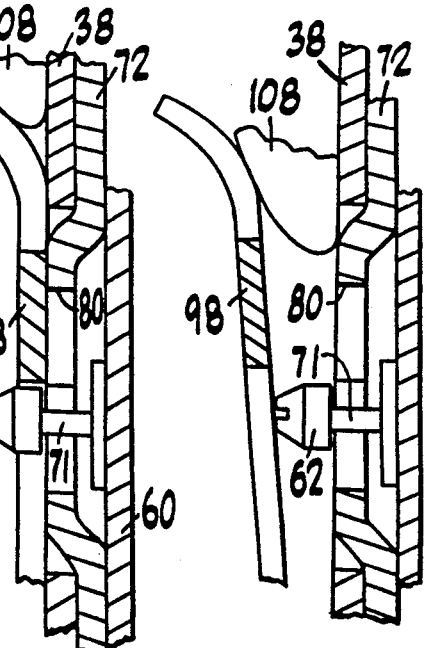
FIG. 7C is a fragmentary sectional view illustrating the relative positions of the parts of our device with the night vision goggle mount assembly locked in position on the helmet visor housing.
Figure 7D:
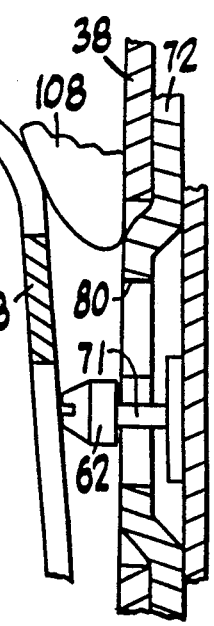
FIG. 7D is a fragmentary sectional view illustrating the relative positions of parts of our device just prior to removal of the night vision goggle mount assembly from the helmet visor housing.
Figure 6:
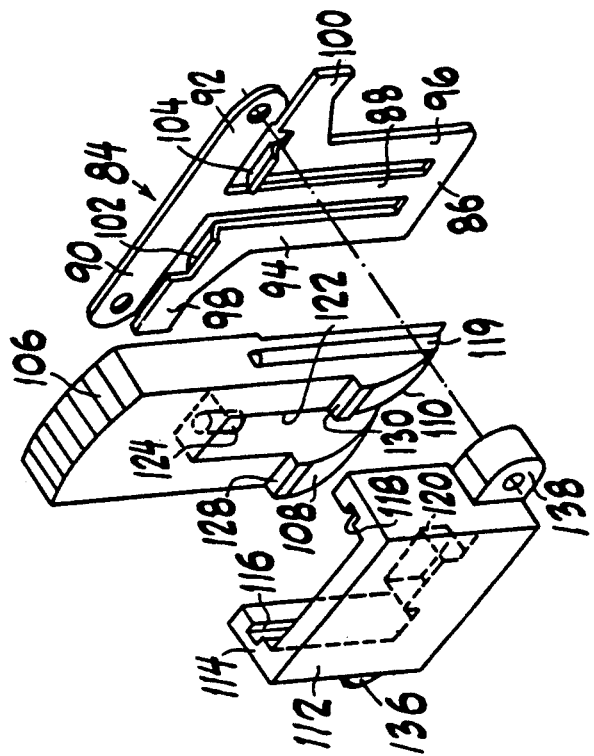
FIG. 6 is an exploded view illustrating the parts of the actuating subassembly of our device.
Figure 5:
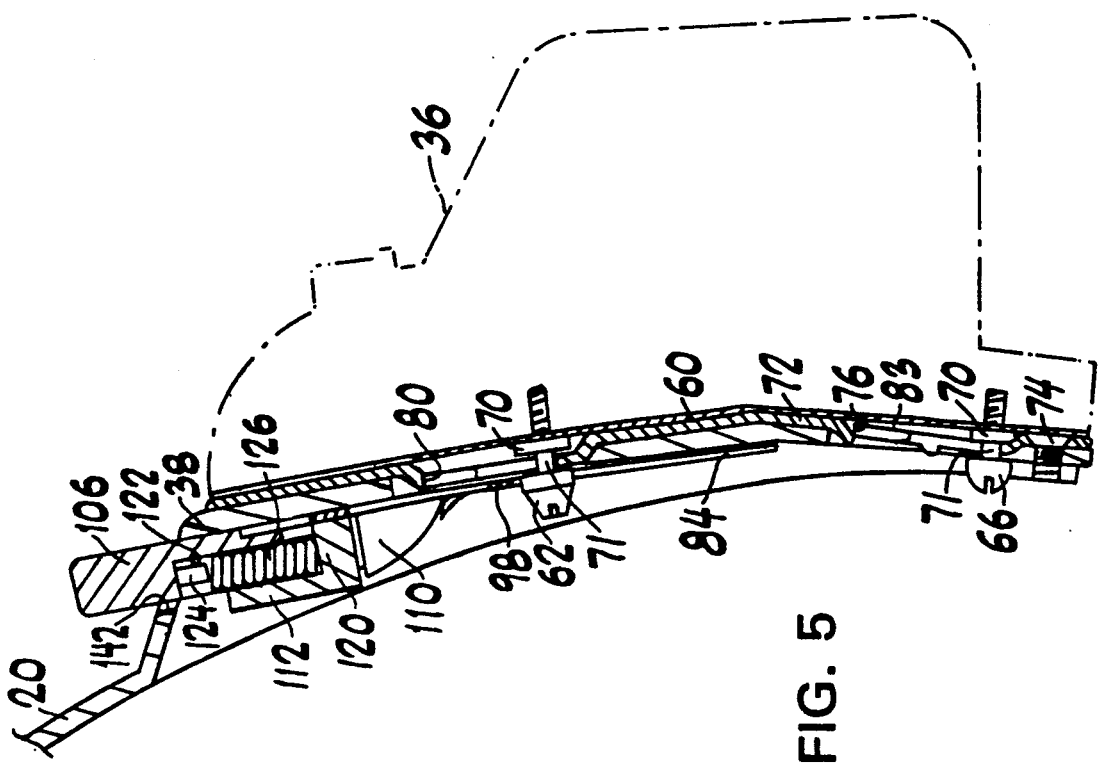
FIG. 5 is a fragmentary sectional view illustrating the relative positions of the parts of our device with the night vision goggle mount assembly attached to the helmet visor housing.

The operation of our device for readily detachably mounting a night vision goggle mount assembly on a protective helmet is best understood by a consideration of FIGS. 7A to 7D. First, the goggles proper are detached from the mount 36 in a manner known to the art. Next, the locating pins 62, 64, 66 and 68 are brought into registry with the upper circular portions of the respective keyholes 80, 82, 76 and 78. The mount 36 is moved inwardly of the visor housing 20 so that the heads of the locating pins enter into the keyhole slots. As shown in FIG. 7B, when the head of locating pin 62 moves inwardly of the upper portion of the keyhole 80, it flexes spring arm 94 of spring 84. The mount 36 is then moved downwardly to cause the shanks of the respective locating pins 62, 64, 66 and 68 to move downwardly along the vertically extending slot portions of keyholes 80, 82, 76 and 78. When this occurs, as illustrated in FIG. 7C, the heads o the locating pins 62 and 64 engage the ears 98 and 100 of the leaf spring 84 as it snaps back to its original position. It will readily be seen that in this position of the parts, the mount 36 is locked into position so that it cannot readily be removed therefrom. The fastener sleeve carried by the connector 42 can then be reengaged with the pad 46 and the necessary electrical connections be made. At this point the goggles proper can be reassembled on the mount 36.

When it is desired to move the mount 36 to another helmet provided with our device, the goggles proper first are removed from the mount. Then, the releasing member 106 is depressed to move the shoes 108 and 110 under the bent up portions 102 and 104 of the spring arms 94 and 96 to move the arms to such a position that the heads of the pins 62 and 64 are clear of the ears 98 and 100. The mount 36 can then be moved upwardly until the heads of all the pins 62, 64, 66 and 68 are in register with the circular portions of the keyholes 80, 82, 76 and 78 to permit the mount to be moved away from the housing platform 38. It will readily be appreciated that this operation can be accomplished with the use of only one hand. Moreover, if for any reason the mount is dropped, it will not be permitted to fall owing to the connection between the sleeve 44 and the pad 46.

It will be seen that we have accomplished the objects of our invention. We have provided a device for readily detachably mounting a night vision mount assembly on a protective helmet. Our device can be operated with one hand. It facilitates more extensive use of an expensive night vision goggle assembly. It is lightweight. It has a low profile. It is relatively inexpensive for the result achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for assembling a night vision goggle mount in an operative position on a protective helmet visor housing including in combination interengageable means on said mount and on said housing for guiding said mount into said operative position on said housing, automatic means responsive to movement of said mount into said operative position for locking said interengageable means against disengagement and manually operable means for disabling said locking means to permit said interengageable means to be disengaged, said interengageable means comprising a fastener having a head on one of said mount and said housing and means forming a keyhole slot on the other of said mount and said housing for receiving and retaining said head.

2. Apparatus for assembling a night vision goggle mount in an operative position on a protective helmet visor housing including in combination interengageable means on said mount and on said housing for guiding said mount into said operative position on said housing, automatic means responsive to movement of said mount into said operative position for locking said interengageable means against disengagement and manually operable means for disabling said locking means to permit said interengageable means to be disengaged, said interengageable means comprising a pair of fasteners having heads mounted in spaced relationship on one of said mount and said housing and means forming a pair of correspondingly spaced keyhole slots on the other of said mount and said housing for receiving and retaining said fastener heads.

3. Apparatus for assembling a night vision goggle mount in an operative position on a protective helmet visor housing including in combination interengageable means on said mount and on said housing for guiding said mount into said operative position on said housing, automatic means responsive to movement of said mount into said operative position for locking said interengageable means against disengagement and manually operable means for disabling said locking means to permit said interengageable means to be disengaged, said interengageable means comprising a pair of upper fasteners having heads mounted in spaced relationship to each other on one of said mount and said housing, a pair of lower fasteners having heads mounted in spaced relationship to each other on one of said mount and said housing, means forming a pair of upper keyhole slots in the other of said mount and said housing for receiving and retaining said upper fastener heads and means forming a pair of lower keyhole slots in the other of said mount and said housing for receiving and retaining said lower fastener heads.

4. Apparatus as in claim 3 including a backing plate for mounting said fasteners on said mount.

5. Apparatus as in claim 3 in which said means forming said slots comprises a base plate mounted over discrete openings in said housing.

6. Apparatus as in claim 3 including a backing plate for supporting said fasteners on said mount, said means forming said slots comprising a base plate mounted over discrete openings in said housing.

7. Apparatus for assembling a night vision goggle mount in an operative position on a protective helmet visor housing including in combination interengageable means on said mount and on said housing for guiding said mount into said operative position on said housing, automatic means responsive to movement of said mount into said operative position for locking said interengageable means against disengagement and manually operable means for disabling said locking means to permit said interengageable means to be disengaged, said interengageable means comprising a fastener having a head and a shank carried by one of said mount and said housing and means forming a keyhole slot in the other of said mount and said housing, said keyhole slot having a first portion dimensioned to admit the fastener head and a second portion permitting movement of said shank therealong while retaining said head against removal, said locking means being responsive to movement of said shank into said second slot portion.

8. Apparatus as in claim 7 in which said interengageable means are first interengageable means, said locking means comprising a spring and second interengageable means on said spring and on said fastener operable in response to movement of said shank into said second slot portion.

9. Apparatus as in claim 8 in which said spring is a leaf spring having an ear adapted to move behind said fastener head as said shank moves into said second slot portion.

10. Apparatus as in claim 9 in which said leaf spring ear extends over said first portion of said keyhole slot whereby said head moves into said first portion of said keyhole against the action of said spring.

11. Apparatus as in claim 10 in which said manually operable means comprises means for flexing said leaf spring to a position at which said leaf spring ear is clear of said fastener head with said shank in said second slot portion.

12. Apparatus for readily detachably securing a night vision goggle mount to a protective helmet visor housing formed with a platform having an opening including in combination a fastener having a head and a shank, means securing said fastener to said mount with a portion of said shank exposed, a base plate attached to said housing platform over said opening, said base plate formed with a keyhole slot registering with said opening, said keyhole slot having a first portion dimensioned to admit the fastener head and a second portion dimensioned to permit movement of said fastener shank therealong while retaining said head against withdrawal, a leaf spring on the inside of said base plate, said leaf spring having an ear extending over said keyhole slot whereby said fastener head moves through said first portion of said keyhole slot against the action of said leaf spring, said ear dropping behind said fastener head as said shank moves into said second keyhole slot portion automatically to lock said mount to said housing, and manually operable means on said plate for flexing said leaf spring to a position at which said ear is clear of the fastener head with said shank in said second keyhole slot portion.

13. Apparatus as in claim 12 including a second fastener having a head and a shank secured to said mount in spaced relationship to said first-named fastener, said base plate being formed with a second keyhole slot similar to said first-named slot for cooperation with said second fastener, said leaf spring formed with a second ear adapted to drop behind the head of said second fastener with the second fastener shank in the second portion of the second keyhole slot.

14. Apparatus as in claim 12 in which said leaf spring has an upturned free end, said manually operable means comprising a member having a shoe, means mounting said member for movement between an actuated position at which said shoe extends under said upturned end to flex said spring and a retracted position and means for biasing said member to said retracted position.

15. Apparatus as in claim 13 including third and fourth fasteners, each having a head and a shank, said third and fourth fasteners being secured to said mount in spaced relationship, said base plate being formed with third and fourth keyhole slots for cooperation with said third and fourth fasteners.

16. Apparatus as in claim 15 in which said first and second fasteners are upper fasteners and said third and fourth fasteners are lower fasteners.

17. Apparatus as in claim 5 in which said base plate is formed with recessed areas around said keyhole slots to facilitate initial alignment of said fasteners with the keyhole slots.

* * * * *